July 5, 1949.　　　　T. E. FRISCO　　　　2,475,385
TOOLHOLDER
Filed July 21, 1944　　　　　　　　　　2 Sheets-Sheet 1
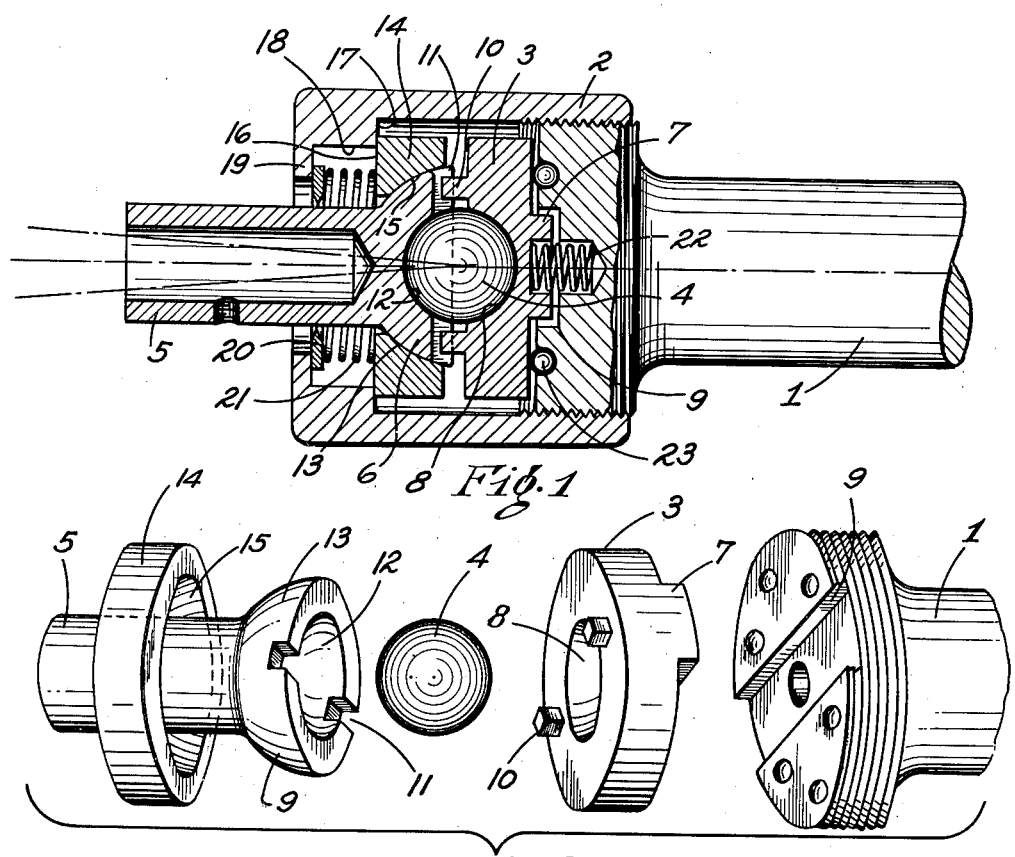
Fig.1
Fig.2
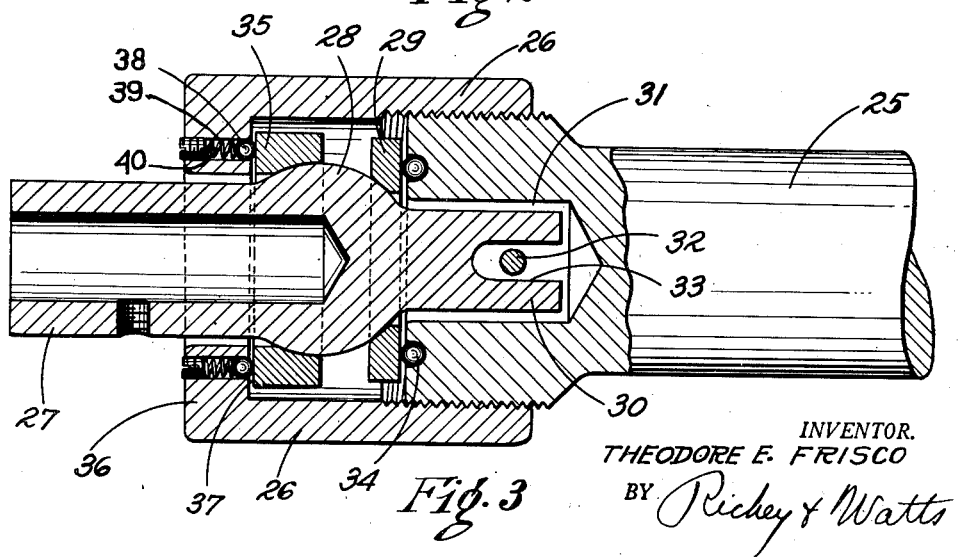
Fig.3
INVENTOR.
THEODORE E. FRISCO
BY Richey & Watts
ATTORNEYS July 5, 1949.  T. E. FRISCO  2,475,385
TOOLHOLDER
Filed July 21, 1944  2 Sheets-Sheet 2
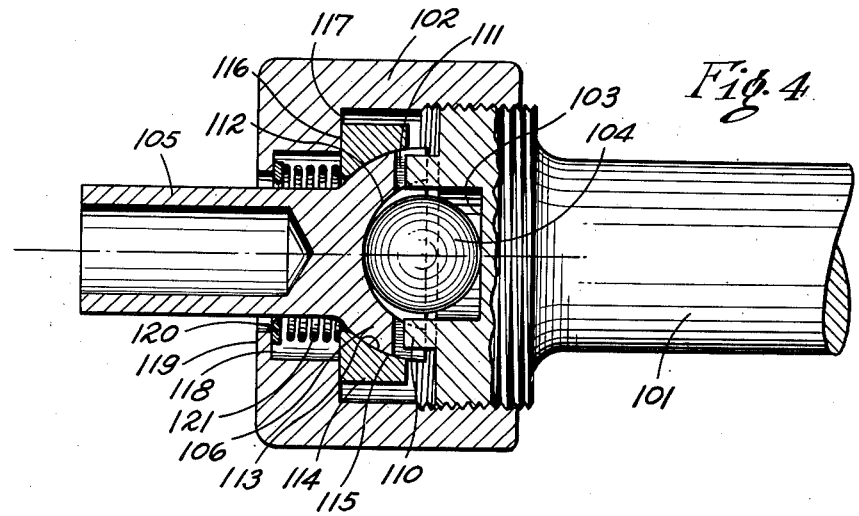
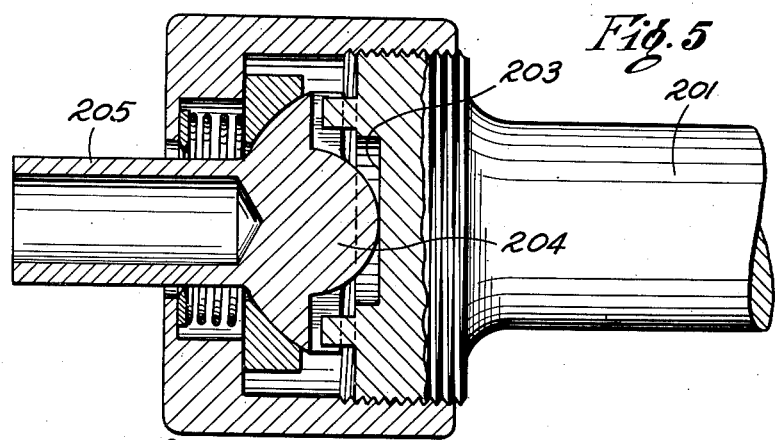
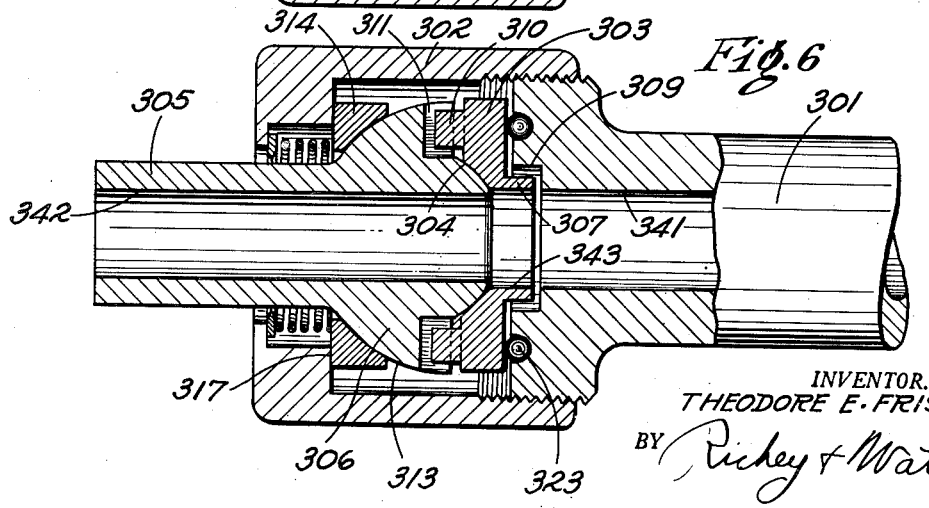
INVENTOR.
THEODORE E. FRISCO
BY *Richey & Watts*
ATTORNEYS Patented July 5, 1949

2,475,385

UNITED STATES PATENT OFFICE 2,475,385

TOOLHOLDER

Theodore E. Frisco, Cleveland, Ohio

Application July 21, 1944, Serial No. 546,037

2 Claims. (Cl. 279—16)

1

The present invention relates to a floating tool holder.

The principal object of this invention is to support a tool for floating or hunting movement, including both annular deviation and lateral offset of the tool axis with respect to the support axis in any direction, and to firmly secure the tool in position for operation without interfering with either the angular deviation or the lateral offset which it may have selected. Another object is to support a tool for angular and lateral hunting movement and to prevent chattering when the tool is in use.

Other objects and advantages of the invention will appear from the following detailed description of preferred embodiments.

In the accompanying drawings:

Fig. 1 is a longitudinal central sectional view of the holder and a fragmentary portion of the shank;

Fig. 2 is an exploded view of the several parts thereof;

Fig. 3 is a section of a longitudinal modification;

Fig. 4 is a similar section of a further modification;

Fig. 5 is a similar section of another modification; and

Fig. 6 is a similar section of another modification.

Referring to Figs. 1 and 2 of the drawing, the shank 1 may be fixed in position on any suitable support, such as the tail stock of a lathe. As shown in Fig. 1 the inner end of the shank 1 is threaded into one end of the barrel 2. Assembled within the barrel 2 are a socket member 3, a ball 4, and a tool holder 5 formed with a socket member 6. The socket member 3 is formed with a transverse rib 7 and has a recess 8 in its opposite face to engage the ball 4. The rib 7 extends into a transverse slot 9 formed in the inner end of the shank 1. The rib 7 is narrower than the slot 9, and the member 3 is smaller in diameter than the barrel 2, permitting universal radial movement of the member 3 with respect to the shank 1. On its opposite face the socket member 3 is formed with a pair of lugs 10 which extend into notches 11 formed in the socket member 6 carried by the tool holder 5. The lugs 10 are narrower and shorter than the notches 11 to permit universal angular movement of the tool holder 5.

The foregoing parts, assembled as shown in Fig. 1, constitute a floating universal joint. Relative rotation of the tool holder 5 and the shank

2

1 is prevented by the rib 7 and the lugs 10. The tool holder 5 may be tilted in any direction with respect to the axis of the shank 1 by reason of the engagement of the sockets 3 and 6 with the ball 4. The axis of the tool holder 5 may be offset with respect to the shank axis by radial movement of the socket member 3 on the inner end of the shank 1.

The socket member 6 is formed at its end with a recess 12 to engage the ball 4, and also with a convex, substantially spherical surface 13. A ring 14 surrounds the socket member 6 and is formed with a concave, substantially spherical surface 15 engaging the surface 13. The opposite face 16 of the ring 14 engages a shoulder 17 on the interior of the barrel 2. The ring 14 is smaller in diameter than the interior of the barrel 2, permitting universal radial movement of the ring with respect to the barrel. The shoulder 17 is preferably of sufficient radial length to remain in contact with the face 16 of the ring 14 in all positions of the ring.

Beyond the shoulder 17 the barrel 2 has a counterbore 18 terminating in an inturned flange 19. A retainer ring 20, smaller in diameter than the counterbore 18, fits around the tool holder 5 and slidably engages the flange 19 so as to close the end of the barrel without preventing either angular or lateral movement of the tool holder 5. A spring 21 engages the retainer ring 20 and the face 16 of the ring 14, serving to hold the retainer ring against the flange 19 and to press the ring 14, the socket member 6, the ball 4, and the socket member 3 toward the shank 1.

A centering spring 22 may be frictionally engaged in axial recesses in the inner end of the shank 1 and the adjacent face of the socket member 3 to urge the socket member 3 into axial alignment with the shank 1. Anti-friction balls 23 may be disposed between the inner end of the shank 1 and the socket member 3 to facilitate radial movement of the socket member 3 under load.

In operation, the shank 1 may be secured in fixed position, and any desired tool, for example a reamer, may be secured in the tool holder 5. The work may then be rotated and fed towards the tool. Before the work contacts the tool the barrel 2 is loosened so that the shoulder 17 is out of contact with the ring 14. In this position the ball and socket joint parts are held together by the spring 21, and the tool holder 5 is free to move both angularly and laterally with respect to the axis of the shank 1. The tool is started in the work by the operator and is then free to center itself in the work without regard to slight variations between the axis of the work and the axis of the shank 1.

As soon as the tool has found its correct position, the operator may secure it in that position and prevent chattering or further movement of the tool by simply screwing the barrel 2 toward the shank 1 until the shoulder 17 contacts the ring 14 and presses and locks the parts together. A partial turn of the barrel is normally sufficient to free the tool to hunt its correct center, or to lock the tool in its selected position.

Manifestly, the same general procedure may be followed in the event it is desired to rotate the tool instead of the work. When the holder is used in this manner it may be rotated in the direction to screw the shank 1 into the barrel 2, so that retarding the rotation of the barrel causes the parts to be screwed together to lock the tool in its selected position.

In the modification shown in Fig. 3, the shank 25 is threaded into the barrel 26. The tool holder 27 is formed with a ball 28 bearing against a socket member 29, and with a reduced bifurcated extension 30 which enters a central recess 31 in the shank 25. Relative rotation of the shank 25 and the tool holder 27 is prevented by a pin 32 extending across the recess 31 and passing through the slot 33 between the bifurcations of the extension 30. The pin 32 is smaller in diameter than the width of the slot 33, and the extension 30 is smaller than the recess 31, so that the tool holder 27 may move laterally and angularly with respect to the shank 25 in all directions.

The socket member 29 is smaller in diameter than the interior of the barrel 26, so that it may move radially in all directions with respect to the shank 25. If desired, anti-friction bearings 34 may be disposed between the socket member 29 and the inner end of the shank 25 to facilitate such movement.

A ring 35, corresponding to the ring 11 in Fig. 1, engages the ball 28 adjacent the shank of the tool holder 27, and is smaller in diameter than the interior of the barrel 26 to permit radial movement of the ring. The barrel 26 is formed with an inturned flange 36 adapted to engage the front face 37 of the ring 35 when the barrel is screwed down so as to lock the parts in their selected position in the same manner as described in connection with Figs. 1 and 2. Spring pressure to hold the parts together when the barrel is loosened may be provided by balls 38 slidably mounted in holes 39 in the flange 36 and urged against the ring 35 by springs 40. The operation of this form of the invention is substantially the same as the operation of the form shown in Figs. 1 and 2 and described above.

In the modification shown in Fig. 4, a shank 101 is screwed into one end of a barrel 102. The inner end face of the shank 101 is formed with an axial bore 103 which serves as a socket member to receive the ball 104. Adjacent the bore 103 the end face of the shank 101 is formed with projecting lugs 110. A tool holder 105 is provided with a socket member 106 on its inner end to engage the ball 104. The socket member 106 is formed with notches 111 to receive the lugs 110. As in the embodiment shown in Figs. 1 and 2, the lugs 110 are narrower and shorter than the notches 111 to permit universal annular movement of the tool holder 105 with respect to the axis of the shank 101. The ball 104 is smaller in diameter than the bore 103 so that the ball 104 may move laterally in all directions with respect to the axis of the shank 101. As shown in Fig. 4, the spherical recess 112 in the socket member 106 which receives the ball 104 may be curved on a slightly greater radius than the radius of the ball 104, so as to permit freer movement of the ball 104 radially with respect to the socket 103 in any direction. This relationship of the recess 112 and the ball 104 also permits further angular movement of the holder in the event the ball should be offset radially to the limit of its movement in the bore 103, and reduces the friction of the parts, particularly when the shank is rotated and the ball 104 is offset radially from the axis of the shank 101.

The socket member 106 is formed on its outer face with a convex, substantially spherical surface 113, preferably concentric with the surface of the ball 104. A ring 114 surrounds the socket member 116 and is formed with a concave, substantially spherical surface 115 engaging the surface 113. The opposite face 116 of the ring 114 engages a shoulder 117 on the interior of the barrel 2. As in the form shown in Figs. 1 and 2 the ring 114 is smaller in diameter than the interior of the barrel 102, permitting universal radial movement of the ring with respect to the barrel, and the shoulder 117 is preferably of such length as to remain in contact with the face 116 of the ring in all positions of the latter.

The barrel 102 is also formed with a counterbore 118 terminating in an inturned flange 119 and a retainer ring 120 held in place by a spring 121 is provided to close the opening in the end of the barrel 102 without interfering with the universal movement of the tool holder 105, in the same manner as disclosed in Figs. 1 and 2. The spring 121 also urges the joint parts together when the shoulder 117 is out of contact with the ring 114.

The operation of the device shown in Fig. 4 is substantially the same as the operation of the embodiment shown in Figs. 1 and 2 except that lateral offset of the tool holder 105 in all directions with respect to the axis of the shank 101 is permitted by movement of the ball 104 in the recess 103 instead of by a separate socket member engaging the end of the shank 101.

The modification shown in Fig. 5 is substantially identical with the embodiment shown in Fig. 4 except that instead of a separate ball 104 the tool holder 205 is formed with an integral extension 204 having a spherical surface engaging the bore 203 in the end face of the shank 201. The spherical surface of the projection 204 is free to move radially in all directions within the bore 203 to permit lateral offset of the tool holder 205 with respect to the axis of the shank 201. In other respects the operation of the embodiment shown in Fig. 5 is the same as that shown in Fig. 4.

The embodiment of the invention shown in Fig. 6 is similar to the embodiment shown in Figs. 1 and 2 except that the centering spring 14 is omitted and a central bore is extended through the entire assembly to accommodate tool shanks of unusual length. In this form the shank 301 is provided with an axial bore 341 greater in diameter than the axial bore 342 in the tool holder 305. Thus a tool with an unusually long shank may be secured in the tool holder 305 and the end of the shank may extend into the bore 341. Manifestly the diameters of the openings may be such as to permit any desired degree of movement of the tool holder 305 laterally and angularly with respect to the axis of the shank 301.

A socket member 303, smaller in diameter than the interior of the barrel 302, is arranged for radial movement in all directions against the end face of the shank 301. The tool holder 305 is formed with an integral projection having an annular spherically curved surface 304 engaging a corresponding recess in the face of the socket member 303. The socket member 303 is formed with a transverse rib 307 extending into a transverse slot 309 in the end face of the shank 301, the rib 307 being narrower than the slot 309 as in the embodiment shown in Fig. 1. The socket member 303 also has lugs 310 extending into notches 311 in the head 306 of the tool holder 305. The lugs 310 are narrower and shorter than the notches 311 to permit universal angular movement of the tool holder 305. The ring 314 engages the convex spherical surface 313 on the tool holder 305 and is engageable by the shoulder 317 in the barrel 302 as in the embodiment shown in Figs. 1 and 2. If desired, anti-friction balls 323 may be disposed between the socket member 303 and the face of the shank 301 to facilitate radial movement of the socket member 303. The socket member 303 is also formed with an axial bore 343 which may be of the same diameter as the bore 341 so as to permit passage of a long tool shank without interfering with the universal movement of the tool holder 305. In other respects the construction and operation of the form shown in Fig. 6 are the same as in the embodiment shown in Figs. 1 and 2.

In all the embodiments shown it will be seen that the tool holder is free for universal movement both laterally and angularly with respect to the axis of the shank when the barrel is loosened so that the parts are held together only by spring pressure. In each embodiment the tool holder may be locked in any selected position with respect to the shank by simply screwing the barrel down against the joint. The locking of the parts in position does not exert any forces tending to alter the selected position of the tool holder either laterally or angularly with respect to the shank. Thus a tool held in the holder of any of the embodiments shown may be permitted to hunt its own position of alignment with the work when being started, and then by a simple tightening of the barrel may be locked in the selected position so as to continue its work without chattering or further movement.

Although several embodiments of the invention have been described in considerable detail it will be understood that many variations and modifications may be resorted to without departing from the scope of the invention as defined in the following claims and similarly that many of the features shown in the various embodiments may be incorporated in the other embodiments when desired.

I claim:

1. A universal floating tool holder comprising a shank element and a tool holder element, convex abutment means associated with and between said elements and arranged to provide for relative angular and lateral motion of said elements, interengaging driving means associated with said elements and arranged to rotatably couple said elements while providing for said relative angular and lateral motion, said tool holder element having a wall portion facing generally axially away from said shank element and lying in a sphere whose center is that of said pivotal motion, a generally radial flange element having a radial wall portion facing said tool holder wall portion, an annular washer between said wall portions and having a radial face and a spherical face complementary to the corresponding wall portions whereby the plane of lateral motion is perpendicular to the axis of the shank element, and sleeve means extending between said generally radial flange element and said shank element, said sleeve means being threaded to one of said last named elements in order to draw them together, said annular washer providing for clamping said shank and tool holder elements together in any adjusted position.

2. A universal floating tool holder comprising a shank element and a tool holder element, convex abutment means associated with and between said elements and arranged to provide for relative angular and lateral motion of said elements, interengaging driving means associated with said elements and arranged to rotatably couple said elements while providing for said relative angular and lateral motion, said tool holder element having a wall portion facing generally axially away from said shank element and lying in a sphere whose center is that of said pivotal motion, a generally radial flange element having a radial wall portion facing said tool holder wall portion, an annular washer between said wall portions and having a radial face and a spherical face complementary to the corresponding wall portions whereby the plane of lateral motion is perpendicular to the axis of the shank element, sleeve means extending between said generally radial flange element and said shank element, said sleeve means being threaded to one of said last named elements in order to draw them together, said annular washer providing for clamping said shank and tool holder elements together in any adjusted position, and spring means between said washer and an associated element arranged to urge said elements into intimate frictional engagement.

THEODORE E. FRISCO.

REFERENCES CITED

The following references are of record in the file of this patent:

UNITED STATES PATENTS

| Number | Name | Date |
| --- | --- | --- |
| 553,265 | Scholer | Jan. 21, 1896 |
| 1,513,647 | Spiritus | Oct. 28, 1924 |
| 1,566,553 | Maisch | Dec. 22, 1925 |
| 1,782,633 | Schiltz | Nov. 25, 1930 |
| 1,907,447 | Schiltz | May 9, 1933 |

OTHER REFERENCES

Hervig, American Machinist of May 24, 1923, page 773, copy of which is in class 279–16 in Division 52.